US011336130B1

(12) United States Patent
Shaw et al.

(10) Patent No.: US 11,336,130 B1
(45) Date of Patent: May 17, 2022

(54) LOW-LOSS PLANAR WINDING CONFIGURATIONS FOR AN AXIAL FLUX MACHINE

(71) Applicant: E-Circuit Motors, Inc., Newton, MA (US)

(72) Inventors: Steven Robert Shaw, Bozeman, MT (US); George Harder Milheim, Bozeman, MT (US)

(73) Assignee: E-Circuit Motors, Inc., Newton, MA (US)

( * ) Notice: Subject to any disclaimer, the term of this patent is extended or adjusted under 35 U.S.C. 154(b) by 0 days.

(21) Appl. No.: 17/404,061

(22) Filed: Aug. 17, 2021

(51) Int. Cl.
*H02K 1/14* (2006.01)
*H02K 3/32* (2006.01)
*H02K 3/18* (2006.01)
*H02K 1/00* (2006.01)
*H02K 3/52* (2006.01)
*H02K 1/12* (2006.01)
(Continued)

(52) U.S. Cl.
CPC .................. *H02K 1/14* (2013.01); *H02K 1/00* (2013.01); *H02K 3/18* (2013.01); *H02K 3/32* (2013.01); *H02K 1/12* (2013.01); *H02K 3/46* (2013.01); *H02K 3/47* (2013.01); *H02K 3/52* (2013.01)

(58) Field of Classification Search
CPC .. H02K 1/00; H02K 1/12; H02K 1/14; H02K 3/00; H02K 3/18; H02K 3/32; H02K 3/46; H02K 3/47; H02K 3/52
USPC ................ 310/71, 154.35, 154.33, 179, 208, 310/216.001, 216.003
See application file for complete search history.

(56) References Cited

U.S. PATENT DOCUMENTS 2,970,238 A 1/1961 Swiggett
3,096,455 A 7/1963 Hahn
(Continued)

FOREIGN PATENT DOCUMENTS

CN 103001426 A 3/2013
CN 202856473 U 4/2013
(Continued)

*Primary Examiner* — Rashad H Johnson
(74) *Attorney, Agent, or Firm* — Pierce Atwood LLP

(57) ABSTRACT

A planar stator includes conductive traces forming windings for poles, and at least first and second conductive vias extending between first and second conductive layers, the first and second conductive vias being positioned to be located radially on a first side of an annular conductive region of an axial flux machine. The conductive traces include a first conductive trace in the first conductive layer and a second conductive trace in the second conductive layer. The first conductive trace includes a first end turn positioned to be located radially on a second side of the annular active region, the second side being opposite the first side. The second conductive trace includes a second end turn positioned to be located radially on the first side of the annular active region. The first conductive trace extends along a first path that begins at the first conductive via, passes through the first end turn, and ends at the second conductive via. The second conductive trace extends along a second path that begins at the second conductive via and passes through the second end turn. All of the conductive vias that interconnect the first and second conductive traces are positioned to be located radially on the first side of the annular conductive regions.

18 Claims, 14 Drawing Sheets

(51) Int. Cl.
*H02K 3/46* (2006.01)
*H02K 3/47* (2006.01)

(56) References Cited

U.S. PATENT DOCUMENTS

| | | |
|---|---|---|
| 3,944,857 A | 3/1976 | Faulhaber |
| 4,045,696 A | 8/1977 | Lutz et al. |
| 4,115,915 A * | 9/1978 | Godfrey ............... H02K 3/12 29/596 |
| 4,658,162 A | 4/1987 | Koyama et al. |
| 4,677,332 A | 6/1987 | Heyraud |
| 4,733,115 A | 3/1988 | Barone et al. |
| 4,804,574 A | 2/1989 | Osawa et al. |
| 5,099,162 A | 3/1992 | Sawada |
| 5,126,613 A | 6/1992 | Choi |
| 5,332,460 A | 7/1994 | Hosoya |
| 5,592,037 A | 1/1997 | Sickafus |
| 5,616,977 A * | 4/1997 | Hill ............... H02K 3/12 29/596 |
| 5,644,183 A | 7/1997 | Van Loenen et al. |
| 5,710,476 A | 1/1998 | Ampela |
| 5,773,905 A * | 6/1998 | Hill ............... H02K 1/06 310/179 |
| 5,952,742 A | 9/1999 | Stoiber et al. |
| 6,628,038 B1 | 9/2003 | Shikayama et al. |
| 7,109,625 B1 | 9/2006 | Jore et al. |
| 7,112,910 B2 | 9/2006 | Lopatinsky et al. |
| 7,301,428 B2 | 11/2007 | Suzuki et al. |
| 7,415,756 B2 | 8/2008 | Ishida et al. |
| 7,523,540 B2 | 4/2009 | Morel |
| 7,582,999 B2 * | 9/2009 | Atkinson ............... H02K 3/50 310/179 |
| 7,750,522 B2 | 7/2010 | Gizaw et al. |
| 7,763,997 B2 | 7/2010 | Dubuc et al. |
| 7,812,697 B2 | 10/2010 | Fullerton et al. |
| 7,882,613 B2 | 2/2011 | Barthelmie et al. |
| 8,058,762 B2 | 11/2011 | Asano |
| 8,179,002 B2 | 5/2012 | Mancuso et al. |
| 8,225,497 B2 | 7/2012 | Johnson et al. |
| 8,339,019 B1 | 12/2012 | Oyague |
| 8,362,731 B2 | 1/2013 | Smith et al. |
| 8,397,369 B2 | 3/2013 | Smith et al. |
| 8,400,038 B2 | 3/2013 | Smith et al. |
| 8,558,425 B2 | 10/2013 | Stahlhut et al. |
| 8,598,761 B2 | 12/2013 | Langford et al. |
| 8,692,637 B2 | 4/2014 | Richards et al. |
| 8,716,913 B2 | 5/2014 | Kvam et al. |
| 8,723,052 B1 | 5/2014 | Sullivan et al. |
| 8,723,402 B2 | 5/2014 | Oyague |
| 8,736,133 B1 * | 5/2014 | Smith ............... H02K 3/26 310/208 |
| 8,785,784 B1 | 7/2014 | Duford et al. |
| 8,816,543 B2 | 8/2014 | Kozar et al. |
| 8,823,241 B2 | 9/2014 | Jore et al. |
| 8,941,961 B2 | 1/2015 | Banerjee et al. |
| 9,013,257 B2 | 4/2015 | Steingroever |
| 9,154,024 B2 | 10/2015 | Jore et al. |
| 9,269,483 B2 | 2/2016 | Smith et al. |
| 9,479,038 B2 | 10/2016 | Smith et al. |
| 9,673,684 B2 * | 6/2017 | Shaw ............... H02K 9/22 |
| 9,673,688 B2 | 6/2017 | Shaw |
| 9,800,109 B2 | 10/2017 | Shaw |
| 9,859,763 B2 * | 1/2018 | Shaw ............... H02K 9/22 |
| 10,135,310 B2 * | 11/2018 | Schuler ............... H02K 1/32 |
| 10,170,953 B2 * | 1/2019 | Shaw ............... H05K 1/0298 |
| 10,186,922 B2 * | 1/2019 | Schuler ............... H02K 1/2793 |
| 10,211,694 B1 | 2/2019 | Shaw |
| 10,256,690 B2 | 4/2019 | Shaw |
| 10,951,080 B2 * | 3/2021 | Mikail ............... H01F 5/04 |
| 11,005,322 B2 | 5/2021 | Milheim et al. |
| 11,121,614 B2 | 9/2021 | Milheim |
| 2002/0145360 A1 | 10/2002 | Pullen |
| 2005/0067905 A1 | 3/2005 | Maney et al. |
| 2005/0194855 A1 | 9/2005 | Hasbe et al. |
| 2006/0055265 A1 | 3/2006 | Zalusky |
| 2006/0202584 A1 | 9/2006 | Jore et al. |
| 2007/0247014 A1 | 10/2007 | Schach et al. |
| 2008/0067874 A1 | 3/2008 | Tseng |
| 2008/0100166 A1 | 5/2008 | Stahlhut et al. |
| 2009/0021333 A1 | 1/2009 | Fiedler |
| 2009/0072640 A1 | 3/2009 | Tanaka |
| 2009/0072651 A1 | 3/2009 | Yan et al. |
| 2010/0000112 A1 | 1/2010 | Carow et al. |
| 2010/0123372 A1 | 5/2010 | Huang et al. |
| 2011/0024146 A1 | 2/2011 | Katou et al. |
| 2011/0241460 A1 | 10/2011 | Mebarki et al. |
| 2011/0241470 A1 | 10/2011 | Takeuchi |
| 2011/0273048 A1 * | 11/2011 | Jore ............... H02K 21/24 310/156.37 |
| 2012/0033236 A1 | 2/2012 | Tsugimura |
| 2012/0041062 A1 | 2/2012 | Zhou et al. |
| 2012/0212080 A1 | 8/2012 | Jiang et al. |
| 2012/0217831 A1 | 8/2012 | Jore et al. |
| 2012/0262019 A1 | 10/2012 | Smith et al. |
| 2012/0262020 A1 | 10/2012 | Smith et al. |
| 2013/0049500 A1 | 2/2013 | Shan et al. |
| 2013/0052491 A1 | 2/2013 | Bull et al. |
| 2013/0053942 A1 | 2/2013 | Kamel et al. |
| 2013/0062984 A1 | 3/2013 | Tremelling |
| 2013/0072604 A1 | 3/2013 | Bowen, III et al. |
| 2013/0076192 A1 | 3/2013 | Tanimoto |
| 2013/0119802 A1 | 5/2013 | Smith et al. |
| 2013/0214631 A1 | 8/2013 | Smith et al. |
| 2013/0234566 A1 | 9/2013 | Huang et al. |
| 2013/0342054 A1 | 12/2013 | Long et al. |
| 2014/0021968 A1 | 1/2014 | Lee |
| 2014/0021969 A1 | 1/2014 | Tseng et al. |
| 2014/0021972 A1 | 1/2014 | Barabi et al. |
| 2014/0028149 A1 | 1/2014 | Oyague |
| 2014/0042868 A1 | 2/2014 | Sullivan et al. |
| 2014/0152136 A1 | 6/2014 | Duford et al. |
| 2014/0175922 A1 | 6/2014 | Jore et al. |
| 2014/0201291 A1 | 7/2014 | Russell |
| 2014/0262499 A1 | 9/2014 | Smith et al. |
| 2014/0268460 A1 | 9/2014 | Banerjee et al. |
| 2014/0300223 A1 | 10/2014 | Yamada et al. |
| 2014/0368079 A1 | 12/2014 | Wong et al. |
| 2015/0084446 A1 | 3/2015 | Atar |
| 2015/0188375 A1 | 7/2015 | Sullivan et al. |
| 2015/0188391 A1 | 7/2015 | Carron et al. |
| 2015/0244219 A1 | 8/2015 | Woolmer |
| 2015/0311756 A1 | 10/2015 | Sullivan |
| 2015/0318751 A1 | 11/2015 | Smith et al. |
| 2015/0349609 A1 * | 12/2015 | Tremelling ......... F04D 25/0653 310/63 |
| 2016/0247616 A1 | 8/2016 | Smith et al. |
| 2016/0285327 A1 | 9/2016 | Sasaki et al. |
| 2016/0372995 A1 | 12/2016 | Smith et al. |
| 2017/0040878 A1 | 2/2017 | Smith et al. |
| 2017/0047792 A1 | 2/2017 | Klassen et al. |
| 2017/0098973 A1 * | 4/2017 | Shaw ............... H05K 1/0298 |
| 2018/0123412 A1 | 5/2018 | Karplus et al. |
| 2018/0198338 A1 | 7/2018 | Schuler et al. |
| 2021/0203213 A1 * | 7/2021 | Jore ............... H02K 3/47 |

FOREIGN PATENT DOCUMENTS

| | | |
|---|---|---|
| CN | 103248182 A | 8/2013 |
| CN | 103580412 A | 2/2014 |
| CN | 104426263 A | 3/2015 |
| CN | 104467243 A | 3/2015 |
| CN | 105871089 A | 8/2016 |
| DE | 19954196 A1 | 6/2000 |
| DE | 102010062271 A1 | 6/2012 |
| EP | 0563852 A1 | 10/1993 |
| EP | 1086523 A2 | 3/2001 |
| EP | 2696481 A2 | 2/2014 |
| EP | 2882079 A2 | 6/2015 |
| EP | 3340436 A1 | 6/2018 |
| FR | 2262880 A1 | 9/1975 |
| GB | 2030790 A | 4/1980 |
| GB | 2485185 A | 5/2012 |
| JP | 5836145 B2 | 3/1983 |
| JP | 59213287 A | 12/1984 |

(56) References Cited

FOREIGN PATENT DOCUMENTS

| | | | |
|---|---|---|---|
| JP | 2008301666 | A | 12/2008 |
| JP | 4639632 | B2 | 2/2011 |
| WO | 2004/015843 | A1 | 2/2004 |
| WO | 2004073365 | A2 | 8/2004 |
| WO | 2009068079 | A1 | 6/2009 |
| WO | 2016186533 | A1 | 11/2016 |

* cited by examiner

LOW-LOSS PLANAR WINDING CONFIGURATIONS FOR AN AXIAL FLUX MACHINE

Permanent magnet axial flux motors and generators are described by several patents, including U.S. Pat. Nos. 7,109,625; 10,170,953; 9,859,763; 10,211,694; and 10,256,690.

BACKGROUND

Summary

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a stator comprises one or more dielectric substrates adapted to be positioned within an annular active region of an axial flux machine that includes a rotor configured to rotate about an axis of rotation, conductive traces included in at least first and second conductive layers defined by the one or more dielectric substrates, the conductive traces forming windings for poles of the stator, and at least first and second conductive vias extending between the first and second conductive layers, the first and second conductive vias being positioned to be located radially on a first side of the annular active region. The conductive traces include a first conductive trace in the first conductive layer and a second conductive trace in the second conductive layer. The first conductive trace includes a first end turn positioned to be located radially on a second side of the annular active region, the second side being opposite the first side. The first conductive trace extends along a first path that begins at the first conductive via, passes through the first end turn, and ends at the second conductive via. The second conductive trace includes a second end turn positioned to be located radially on the first side of the annular active region. The second conductive trace extends along a second path that begins at the second conductive via and passes through the second end turn. The second conductive trace is connected to the first conductive trace through the second conductive via so that the first and second paths are connected in series. All conductive vias that interconnect the first and second conductive traces are positioned to be located radially on the first side of the annular active region.

In some embodiments, a stator comprises one or more dielectric substrates adapted to be positioned within an annular active region of an axial flux machine that includes a rotor configured to rotate about an axis of rotation, conductive traces included in at least first and second conductive layers defined by the one or more dielectric substrates, the conductive traces forming windings for poles of the stator, and at least first and second conductive vias extending between the first and second conductive layers, the first and second conductive vias being positioned to be located radially on a first side of the annular active region. The conductive traces include a first conductive trace in the first conductive layer and a second conductive trace in the second conductive layer. The first conductive trace includes a first end turn positioned to be located radially on a second side of the annular active region, the second side being opposite the first side. The first conductive trace follows a first path beginning at the first conductive via, extending through the first end turn, and ending at the second conductive via. The second conductive trace includes a second end turn positioned to be located radially on the second side of the annular active region. The second conductive trace follows a second path beginning at the first conductive via, extending through the second end turn, and ending at the second conductive via. All conductive vias that interconnect the first and second conductive traces are positioned to be located radially on the first side of the annular active region.

DETAILED DESCRIPTION

Permanent magnet axial flux motors and generators described by several patents, including U.S. Pat. Nos. 7,109,625; 10,170,953; 9,859,763; 10,211,694; and 10,256,690, the entire contents of which are incorporated herein by reference, feature planar stator assemblies, typically printed circuit boards, between rotors supporting permanent magnets. The currents in the windings in the stator interact with the flux density in the gap established by the magnets to produce torque in motor operation. Similarly, when the machine is driven mechanically, it can function as a generator.

In either mode of operation, the stator of the machine is subject to a time-varying magnetic flux. This time-varying flux interacts with the copper in the stator, inducing currents that circulate in loops and in copper filled areas. These effects cause loss of efficiency in operation. While much of the flux driving these losses is axial, i.e., z directed, there are ancillary components that are θ and radially directed. The magnitude of these components varies as a function of displacement z in the gap.

The stator construction disclosed here applies to a planar composite stator, and incorporates novel features that can mitigate losses associated with θ-directed flux leakage in planar stators, and provide addition benefits.

Electric machines of the type described in the above-noted patents, generally comprise a planar stator ("stator") disposed in the gap of a magnetic structure ("rotor") which presents a pattern of alternating magnet poles and a corresponding flux density in the gap. When the stator is energized by an external drive circuit, the interaction of the currents in the stator with the flux in the gap creates a force density in the active area that may result in the motion of the rotor. Similarly, when the rotor is set in motion by an external mechanical source, the resulting time-varying flux captured by the windings results in voltages over the winding in the stator.

These primary modes of operation for an electric machine, in the abstract, depend only on the axial flux set up by the magnetic circuit. Thus, machines of the type presented in the above-noted patents are called "axial flux" machines, and the magnetic circuit in such machines is designed to support flux predominately in the z direction, i.e., perpendicular to the plane of the stator.

Figure 1:
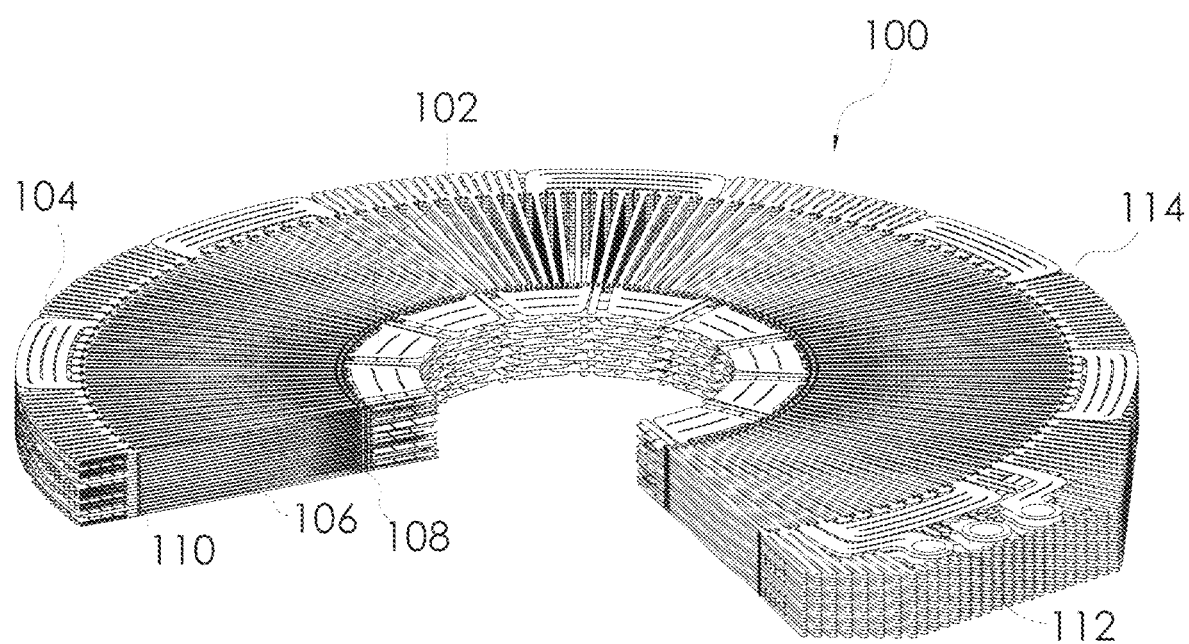
FIG. 1 shows a partial cutaway, perspective view of a stator configured in accordance with the teachings of prior art patents.
Figure 2:
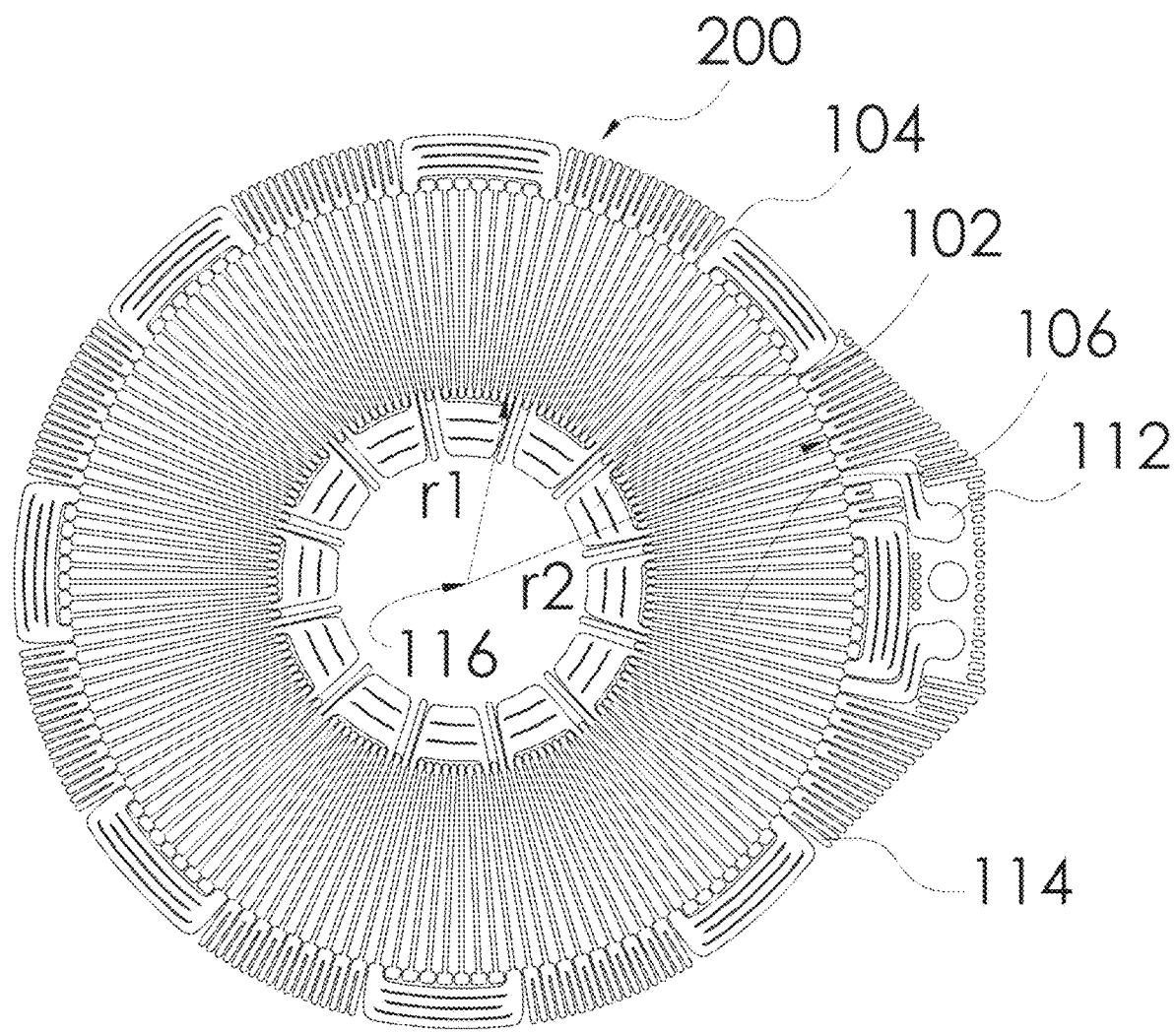
FIG. 2 shows a top view of the stator shown in FIG. 1.

FIGS. 1 and 2 show a partial cutaway, perspective view and a top view, respectively, of an example of a stator configured in accordance with the above-noted patents. As shown, winding structures in the stators of such axial flux machines are organized to present a radial current density (carried by radial traces 106) to interact with the axial flux. The portion of the stator with such radial features, i.e., the annular region extending between a radial distance r1 (measured from a center point 116 of the stator, which coincides with the axis of rotation of the rotor of the machine) and a radial distance r2 (also measured from the center point 116), is located within the "active" region of the machine, in the sense that it is primarily responsible for the production of torque in the machine. The inner and outer radii of the magnets attached to the rotor of the machine are typically positioned at or near the radial distance r1 (measured from stator's axis of rotation) and the radial distance r2 (also measured from the stator's axis of rotation), respectively, thus creating axially directed magnetic flux within the annular active region. The remaining features, e.g., "end turns" 102, 104 radially adjacent to the annular active region of the stator, exist only to connect the radial portions in series and parallel combinations and convey the associated currents and voltages to terminals 112 of the machine.

Figure 3:
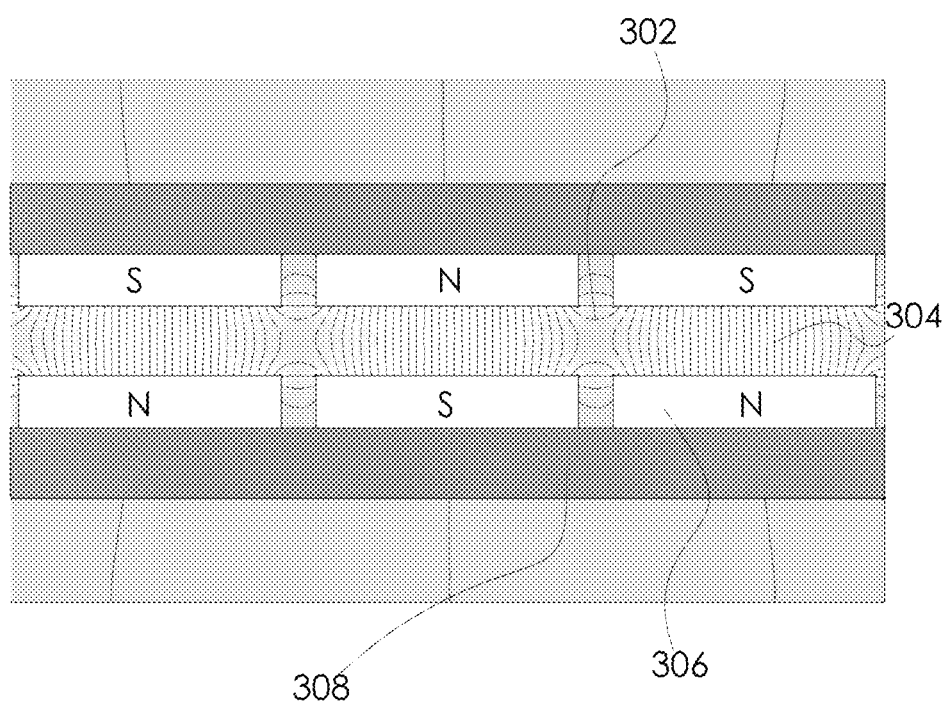
FIG. 3 shows a flux-in-the-gap solution for an axial flux machine having an alternating pole geometry.

While the operation of the machine depends on the axial flux in the gap, there are regions throughout the gap in which the flux may have significant components in the radial and angular directions. Of these, the θ directed leakage resulting from the transition between poles on the rotor may be fairly significant, and may interact with adjacent radial traces 106. The θ component depends on the spacing of magnets and increases in magnitude toward the positive and negative z extent of the gap. In the center of the gap (radially and axially), and in the center of a pole, the flux solution is largely axial. FIG. 3, which is described in more detail below, shows a flux-in-the-gap solution, in which the θ-directed leakage flux component 302 within a gap 304 between opposing magnets 306 is readily apparent.

The impact of these non-axial components on motor or generator performance stems from their interaction with stator structures that form conductive loops or surfaces. To approach this mathematically, it is helpful to visualize the "soap film surface" of a loop or conductive structure—this is the surface over which the flux density can be integrated to find the flux linked by the conductive structure. When flux piercing the surface is time-varying, an electric potential is induced in the loop. If the loop is closed, a current will flow with a magnitude related to the resistance of the loop. The direction of the current can be intuitively understood, accordingly to Lenz's Law, as the current that would be required to oppose the change in the linked flux. Specifically, loops in the stator exposed to time-varying flux densities establish currents that attempt to "cancel" the imposed field. The resulting currents may reduce currents in motor structures that are producing torque; they may interact with any perpendicular component of flux, depending on the path of the loop, to create drag forces; and finally, these currents may combine with currents associated with the winding to result in unexpectedly high current densities and localized heating in specific stator structures. In sum, the effect(s) of these captured leakage flux components reduce the efficiency of the machine, increase losses, decrease thermal performance, etc. The magnitude of these effects increases in proportion to the speed of operation of the machine.

A principle part of the teachings of U.S. Pat. No. 7,109,625 ("the '625 patent") is that the radial portions of a stator, at a specified angle, may be connected in parallel at the inner and outer radii by conductive paths, or vias. The vias form conductive paths perpendicular to the plane of the stator. As shown in FIGS. 1 and 2, for example, sets of radial traces 106 at different angles may be interconnected using inner vias 108 and outer vias 110. The use of such vias 108, 110 introduces design flexibility to establish connections about the stator. For example, using vias 108, 110, the inner end turns 102 for a specific set of radial traces 106 can be on a different layer from the corresponding outer end turns 104. The vias 108, 110 provide connection points at the inner and outer radius to every radial trace 106, allowing a construction and allocation of functions to layers that would not otherwise be feasible. In effect, the vias 108, 110 allow allocation of conductive structures needed to form a winding to different layers so that they do not interfere.

In U.S. Pat. No. 10,170,953 ("the '953 patent"), a corresponding observation is that the functionality on different layers at the outer radius can include thermal paths to the outer edge of the stator. Further, these thermal paths can include thermal interactions across layers, as well as radial thermal paths. Radial thermal paths 114 are evident in FIGS. 1 and 2 at the outer edges of the winding structure, where they can be effectively coupled to a case or other heatsink.

Figure 6:
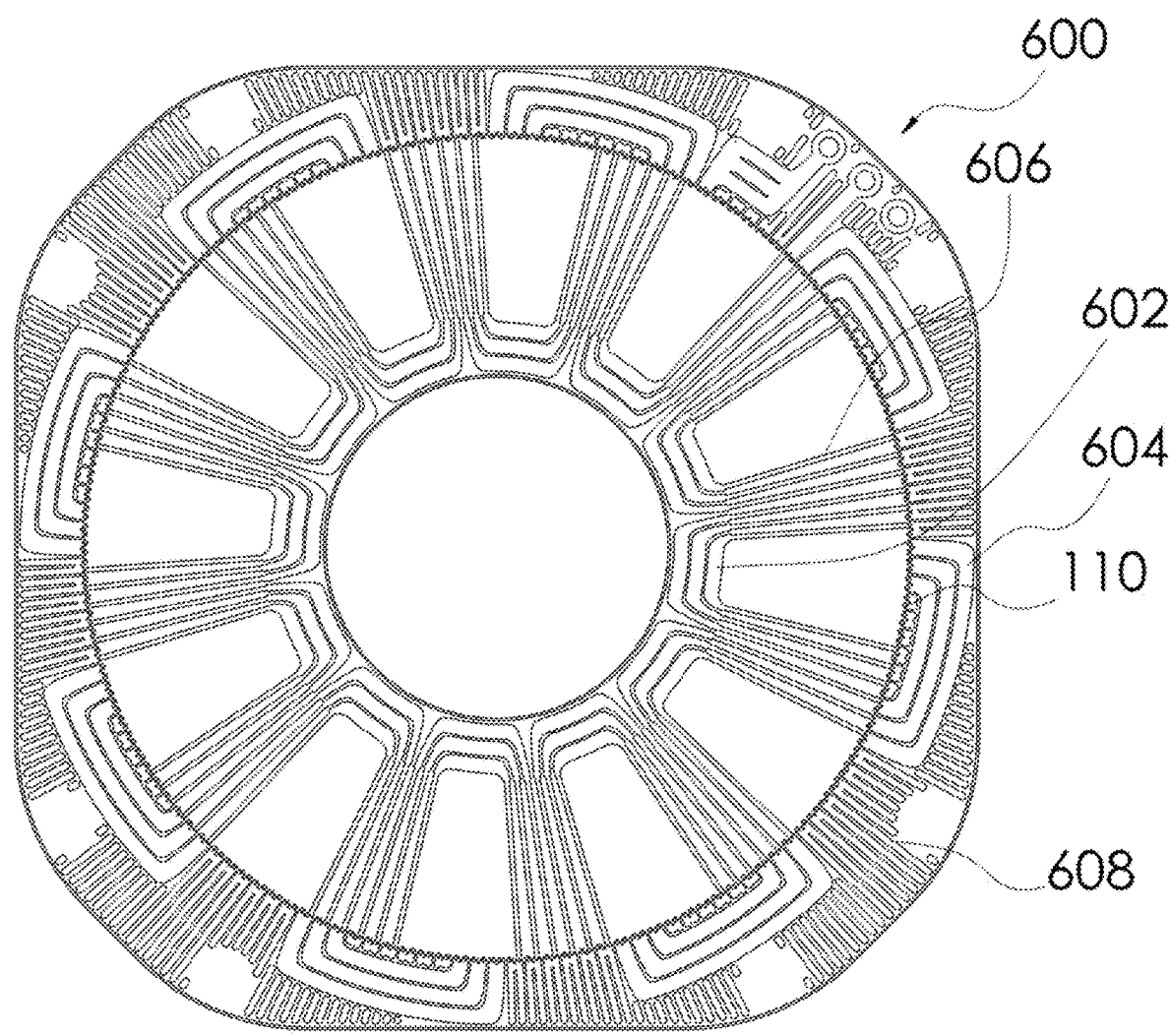
FIG. 6 shows a first layer of a stator configured in accordance with certain teachings of the present disclosure.

In U.S. Pat. No. 10,256,690 ("the '690 patent"), structures are disclosed that allow accumulation of turns in a planar stator in the axial as well as the θ direction. The key aspect of this is a construction in which the vias are electrically conductive over a subsets of adjacent layers. In the '690 patent, and key to the embodiments disclosed there, it is observed that a higher density of inner end turns may be achieved by packing the end turns as closely as possible on each layer. This is distinct from prior designs, in which the inner and outer end turns associated with a given phase were allocated to particular layers to the exclusion of inner and outer end turns for other phases. When the inner end turns are allocated at maximum density, for a three phase machine, there are two unique patterns. Together, those two patterns may effect a complete connection of inner end turns in just two layers. The winding scheme in the '625 patent supports a winding iterating over the turns of adjacent poles first, then linking pole pairs, i.e., turns first, poles second. FIG. 6 shows examples of high density inner end turns 602, which may be contrasted to the low-density end turns as described in the '625 patent, and shown in FIGS. 1 and 2.

Returning to the construction of the '625 patent, with reference to FIGS. 1 and 2, consider a path starting at a single radial trace 106 on the outer radius, continuing radially to the inner radius, following the path of an inner end turn 102, and returning to the outer radius. In plan view, this path is "U" shaped. Several such paths are evident within a structure 400a illustrated in FIG. 4A. The illustrated paths include a first set of radial traces 106a extending between a first outer via 110a and a first inner via 108a, a set of inner end turns 102 extending between the first inner via 108a and a second inner via 108b, and a second set of radial traces 106b extending between the second inner via 108b and a second outer via 110b. If the parallel, axially displaced layers corresponding to this path are considered, which FIG. 1 may help to visualize, the result is a "ribbon" of traces punctuated with vias 108, 110. This is illustrated in FIG. 4B, in which the U-shaped structure 400a of FIG. 4A has been unwrapped and drawn in a plane as a corresponding planar structure 400b.

In the following, consider first the effect of pole to pole leakage flux 302, as shown in FIG. 3, in conjunction with the "unwrapped ribbon" structure 400b illustrated in FIG. 4B. As shown in FIG. 4B, this leakage flux 302a-d is perpendicular to the "sections" bounded by the vias 108, 110. In FIG. 4B, the sizes of the circles representing the leakage flux 302 indicate the relative magnitudes of the depicted flux vectors, and the symbols inside the circles represent the relative direction of the flux vectors, with the "X" symbols indicating flux vectors going into the page and the dot symbols indicating flux vectors going out of the page. The vias 108, 110 and radial traces 106 within these sections form a mesh in which eddy currents will circulate in response to the time-varying θ directed magnetic flux $$\lambda = \int_A B_\theta(r,z,\theta) dA$$

integrated over the respective sections, (a r, z surface), as the rotor turns. In particular, a given loop in the mesh has an induced voltage $$v_l = \frac{d}{dt}\lambda(\theta) = \frac{d\theta}{dt}\frac{d}{d\theta}\lambda(\theta)$$

where $$\omega = \frac{d\theta}{dt}$$

is the speed of rotation, and λ indicates the θ directed flux linkage. As a result of the induced voltage in the loop, there will be a corresponding mesh current determined by the loop resistance.

The previous expressions indicate that the important consideration in this effect, and here we neglect any armature reaction that may occur, is the θ-rate of change of flux linkage for a loop, $$\frac{d}{d\theta}\lambda.$$

Moreover, since flux leakage $B_\theta$ (z, θ) decreases to zero at the center of the gap (e.g., at a point 402 shown in FIG. 4B) by symmetry, the addition of the mesh currents to form branch currents (indicated by arrows 404 in FIG. 4B) will occur in such a way that the top and bottom radial traces 106 have current flow in one direction (to the right in FIG. 4B), while the internal traces carry an equivalent sum of current in the opposite direction (to the left in FIG. 4B). If the axial flux component were constant as a function of z, the net torque from these circulating currents would be zero. Instead, the distribution of current in the structure 400b effectively probes the change of the axial flux component $B_\perp(z, \theta)$ as a function of z. Generally, the axial flux component is somewhat larger at the edge of the stator and decreases toward the center, so torque opposing the direction of motion, i.e., a drag torque, dominates. Importantly, for the structure 400b shown in FIG. 4B, the left and right radial sections are effectively independent due to the vias 108a, 108b at the inner radius. The sections thus create an eddy current braking effect that depends on the speed, the local $$\frac{d}{d\theta}\lambda$$

for the section, and the change in $B_\perp$ as the currents in each trace interact with $B_\perp$ to form a braking torque.

As noted, the currents circulating in a structure 400 with inner vias 108 are indicated by the arrows 404 in FIG. 4B. Note how the inner vias 108a-b break up the structure 400 into three regions. Due to the presence of the inner vias 108a-b, those three regions are independent of each other in the sense that they are driven only by the local $$\frac{d}{d\theta}\lambda.$$

The mesh currents cancel to some degree in the solution of the currents in the radial traces 106 for adjacent loops. Indeed, if the θ directed component of flux were uniform with z, the cancelation would reduce the innermost currents to zero, and current in the top "rail" would be in the opposite direction of current in the bottom rail. However, in the gap 304 (see FIG. 3) the sign of the θ directed component changes as a function of z. Thus, the current in the top rail is in the same direction as the current in the bottom rail. This is indicated by the arrows 404 in FIG. 4B. The top and bottom branch currents are larger in magnitude than the inner currents.

Figure 4A:
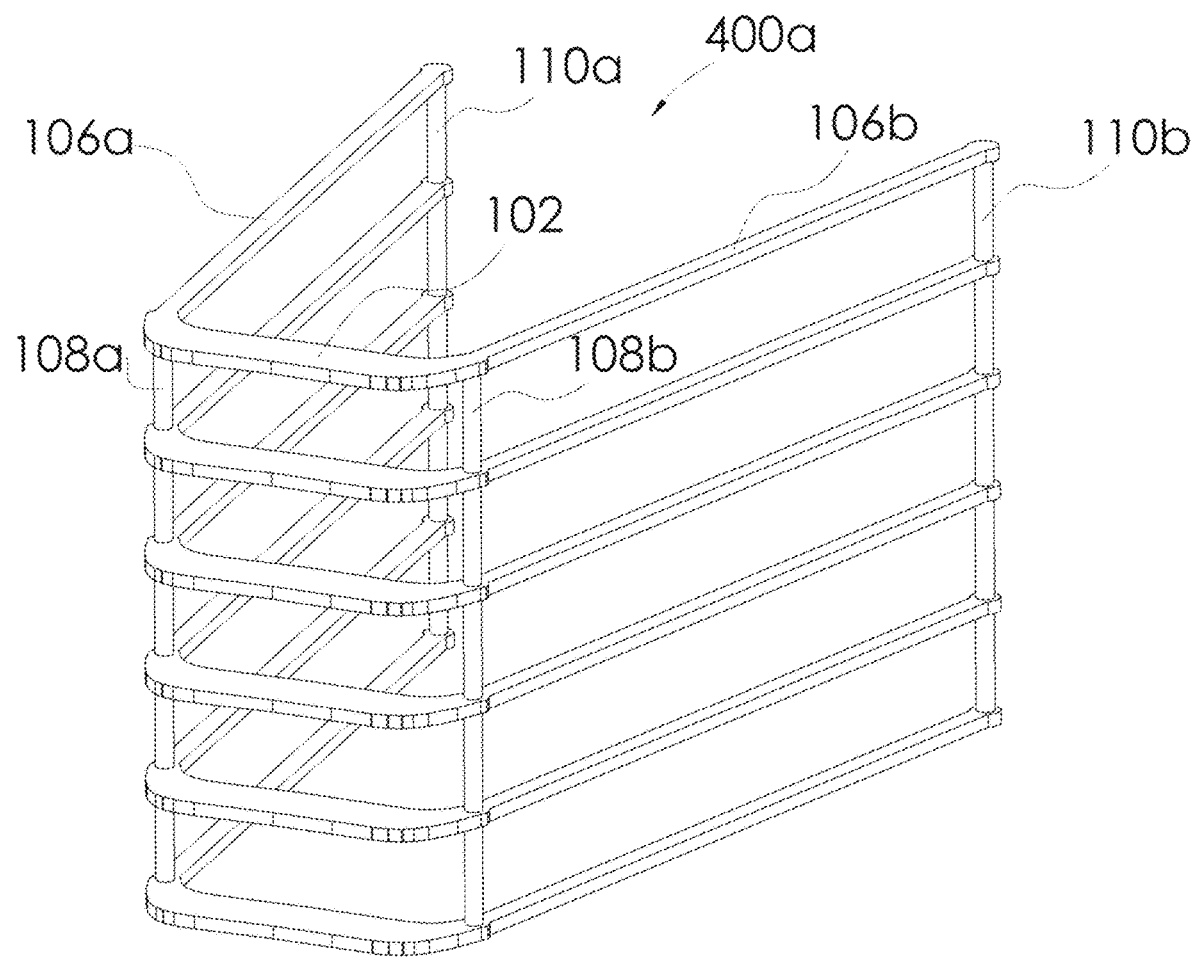
FIG. 4A shows certain components of a stator, which includes inner vias, as those components are oriented within the stator.
Figure 4B:
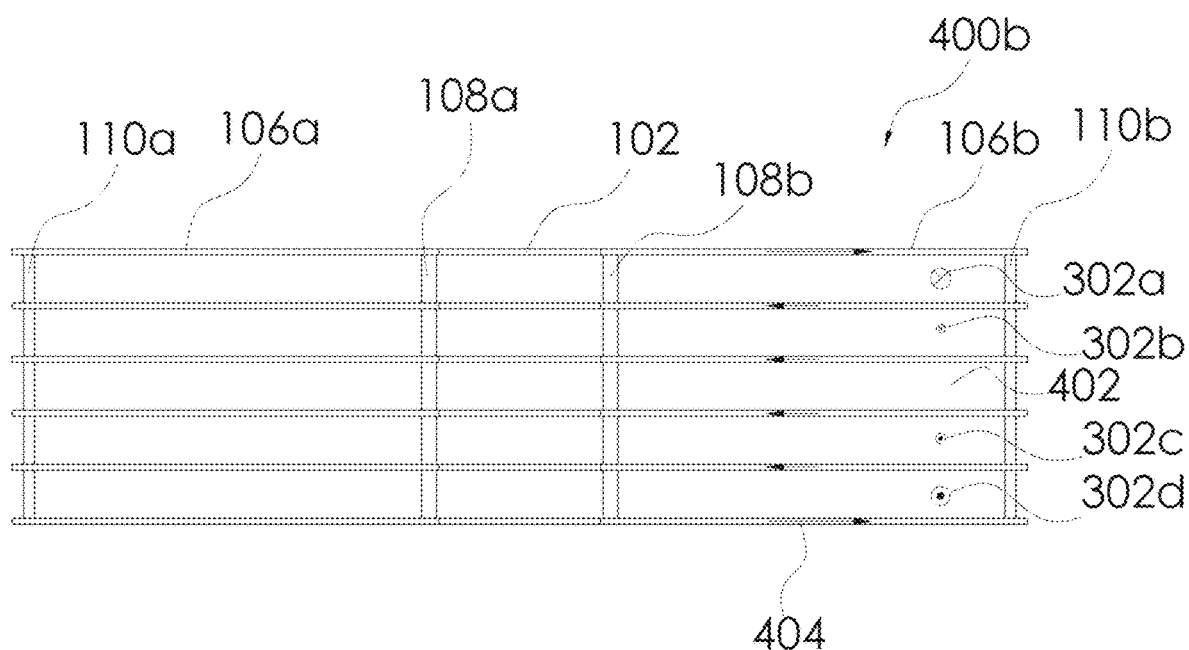
FIG. 4B shows the structure shown in FIG. 4A as it would appear if it were unwrapped and drawn in a plane, and illustrates eddy current paths within that structure due to θ-directed flux.
Figure 5A:
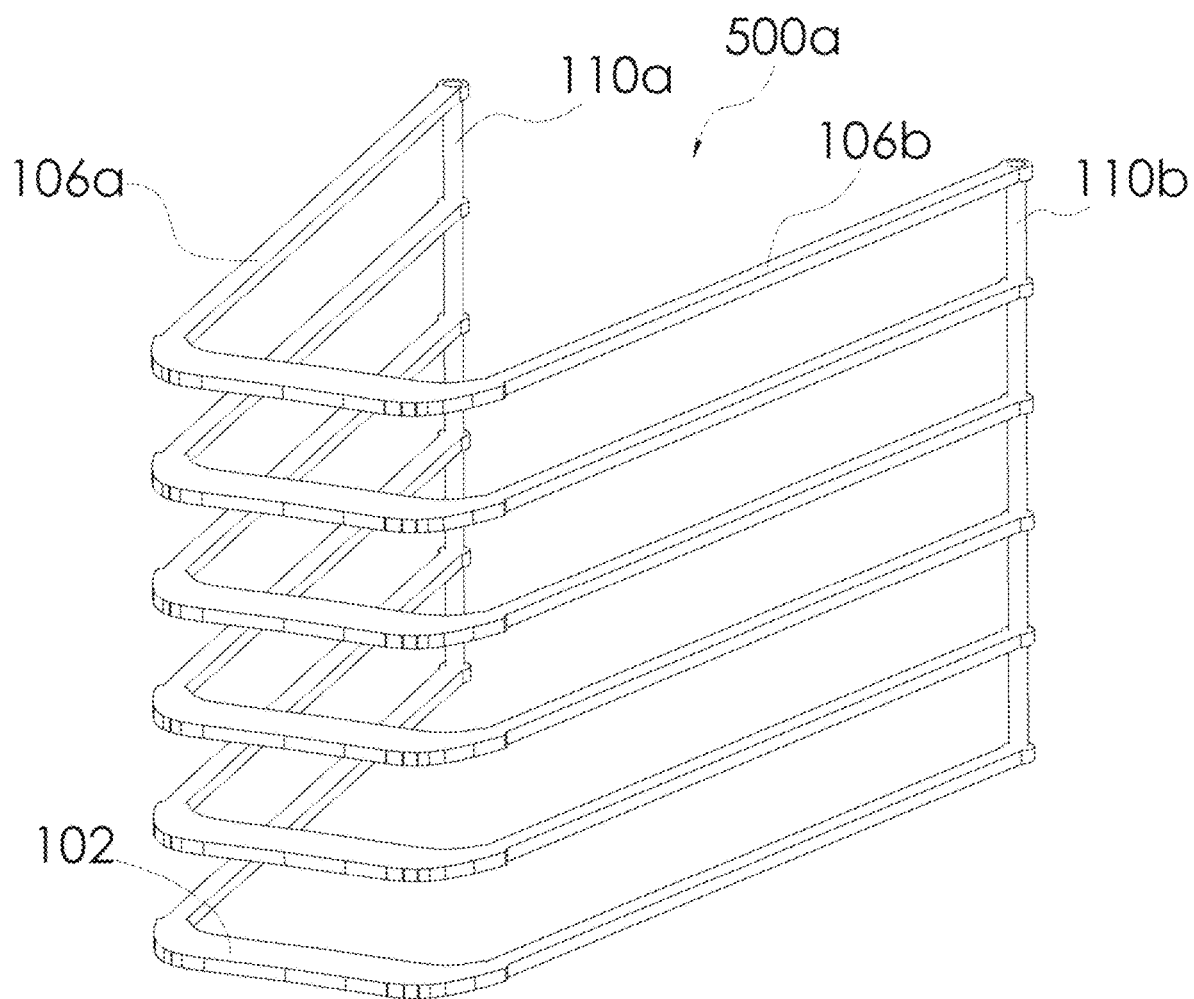
FIG. 5A shows certain components of a stator in which inner vias are omitted in accordance with an aspect of the present disclosure, as those components are oriented within the stator.
Figure 5B:
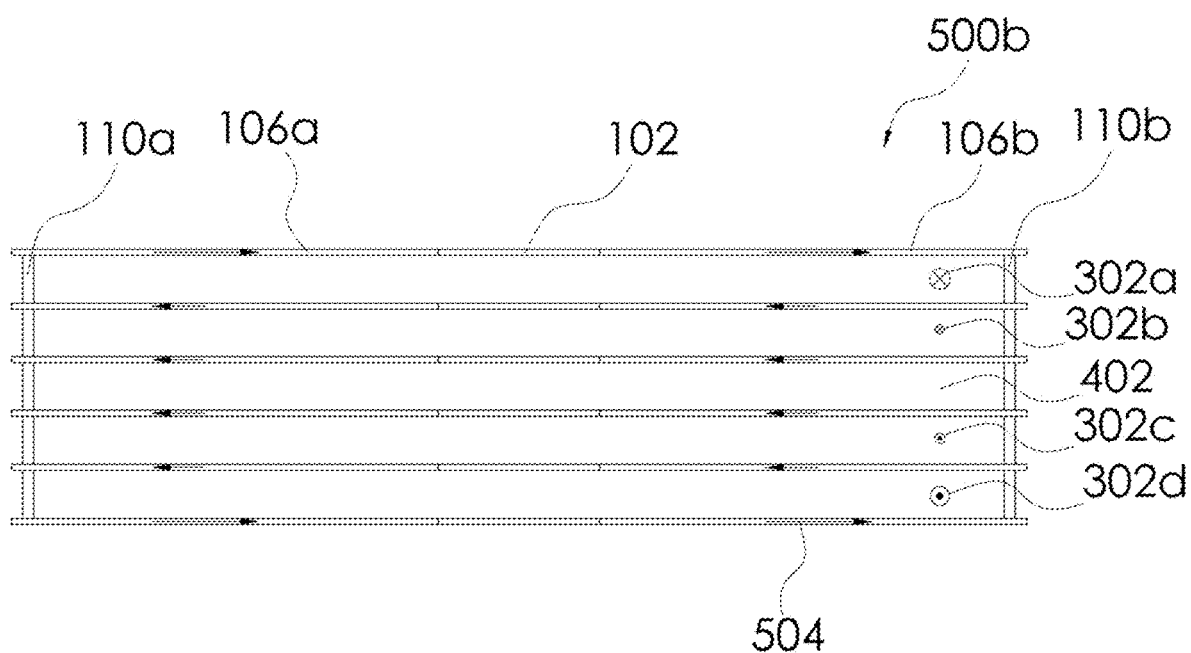
FIG. 5B shows the structure shown in FIG. 5A as it would appear if it were unwrapped and drawn in a plane, and illustrates eddy current paths within that structure due to θ-directed flux.

FIGS. 5A-B show a similar structure 500 as FIGS. 4-B, but where the inner vias 108a-b are omitted. In this case, the currents (indicated by arrows 504) are determined by the change in the net flux linked.

To describe the drag associated with the distribution of currents in the stator structure conveniently, we introduce an inner product—like notation $$\tau = k_0(\alpha B_\perp)'(\gamma I) = B_\perp \alpha' \gamma I = k B_\perp I$$

The interpretation here is that α (a vector) generates a vector of $B_\perp(z)$ components at the z coordinates of the individual traces in the stator structure (capturing the z-variation of the flux density in the stator) and γ (a vector) generates the currents in the individual traces in the mesh at the corresponding z values. The relative components at each trace thus depend linearly on the scalar $B_\perp$ and induced current at a particular θ and at the positive z extent of the stator. Finally, there is a geometric factor $k_0$ to provide a torque, taking into account the radii at which the respective force densities appear. The radial directed flux leakage and armature reaction resulting from the currents is ignored. In this framework, the focus is comparison of torque contributes as a function of the θ-directed flux linkage and the perpendicular flux density.

For the structure 400 in FIGS. 4A-B, using the notation defined above, the torque is the combined effect of the mesh at the first angle (subscript 1), and the mesh at the second angle (subscript 2), i.e., $$\tau_a = k(B_{\perp 1} I_1 + B_{\perp 2} I_2)$$

Alternatively, rewriting terms of the θ dependent flux linked at the first loop $\lambda_1$ at the first angle, and the second loop $\lambda_2$ at the second angle $$\tau_a = k\omega\left(B_{\perp 1} \frac{1}{r_1} \frac{d}{d\theta} \lambda_1 + B_{\perp 2} \frac{1}{r_2} \frac{d}{d\theta} \lambda_2\right)$$

where $r_1$ is a first resistance to calculate the associated current, and $r_2$ is the second resistance. Note that for edges of the stator on either side, the λ is opposite, but results in the same current at the extreme of the stator. To keep the signs consistent for equations involving the entire structure 400, interpret $$\frac{d}{d\theta} \lambda$$

terms to mean the current at the positive z extent of the stator. Ohmic losses in the structure will be proportional to $$\frac{\left(\frac{d}{dt}\lambda\right)^2}{r}$$

where r is the associated resistance.

Considering FIG. 3 for z>0, there are four cases to consider at either "end" of the structure 400 with respect to $\tau_a$. These cases, moving across a rotor pole transition, are $$B_\perp \gg 0, \frac{d\lambda}{d\theta} \approx 0$$

$$B_\perp > 0, \frac{d\lambda}{d\theta} < 0$$

$$B_\perp < 0, \frac{d\lambda}{d\theta} > 0$$

$$B_\perp \ll 0, \frac{d\lambda}{d\theta} \approx 0$$

Here, the $B_\perp \gg 0$ notation indicates that the location under consideration has a strong axial component, i.e., in the middle of a pole. The weaker inequality indicates that transition between poles, on either side of the mid-point. For every feasible combination, at either end of the structure 400 of FIGS. 4A-B, the component added to the $\tau_a$ torque is negative, i.e., drag. Two middle cases, i.e., for angles close to the transition between poles, the drag will vary as the structure 400 passes through the transition, and most of the drag related to θ direct leakage comes from these interactions. The terms driving this effect in the structure 400 of FIGS. 4A-B can be compared to those important in the structure 500 of FIGS. 5A-B.

These conditions can occur at either end of the structure 400, and in combinations depending on the spacing of the "ends" and the position of the rotor, as follows

| | $B_{\perp 1} \gg 0$ $\frac{d\lambda_1}{d\theta} \approx 0$ | $B_{\perp 1} > 0$ $\frac{d\lambda_1}{d\theta} < 0$ | $B_{\perp 1} < 0$ $\frac{d\lambda_1}{d\theta} > 0$ | $B_{\perp 1} \ll 0$ $\frac{d\lambda_1}{d\theta} \approx 0$ |
|---|---|---|---|---|
| $B_{\perp 2} \gg 0$ $\frac{d\lambda_2}{d\theta} \approx 0$ | $\tau_a \approx 0$ | $\tau_a < 0$ | $\tau_a < 0$ | $\tau_a \approx 0$ |
| $B_{\perp 2} > 0$ $\frac{d\lambda_2}{d\theta} < 0$ | $\tau_a < 0$ | $\tau_a \ll 0$ | $\tau_a \ll 0$ | $\tau_a < 0$ |
| $B_{\perp 2} < 0$ $\frac{d\lambda_2}{d\theta} > 0$ | $\tau_a < 0$ | $\tau_a \ll 0$ | $\tau_a \ll 0$ | $\tau_a < 0$ |
| $B_{\perp 2} \ll 0$ $\frac{d\lambda_2}{d\theta} \approx 0$ | $\tau_a \approx 0$ | $\tau_a < 0$ | $\tau_a < 0$ | $\tau_a \approx 0$ |

In the table above, the notation $\tau_a < 0$ indicates that one of the terms in $\tau_a$ is contributing substantially, and $\tau_a \ll 0$ indicates that two such drag terms are contributing.

If the inner vias 108a-b are omitted, as in FIGS. 5A-B, the structure 500 behaves quite differently. The voltage induced depends the flux linked by all the "faces" of the structure 500, i.e., $$v_l = \omega\left(\frac{d}{d\theta}\lambda_1 + \frac{d}{d\theta}\lambda_2 + \frac{d}{d\theta}\lambda_3\right)$$

In what follows, the $\lambda_3$ flux from the radial direction will be neglected as small for geometric reasons (inner ends turns displaced in r). Under this assumption drag term for the structure 500 of FIGS. 5A-B comparable to the first expression for the structure 400 of FIGS. 4A-B can be written as $$\tau_b = k\omega(B_{\perp 2} - B_{\perp 1})\frac{1}{r_1 + r_2 + r_3}\frac{d}{d\theta}(\lambda_1 + \lambda_2)$$

The way in which $B_{\perp 1}$ and $B_{\perp 2}$ (the axial components at the first and second locations) are incorporated can be understood by considering the case where they are equal. The end turn forces whatever current is induced in the loop to flow in opposite directions at the respective locations, resulting in a cancelation of torque. In addition to this, there is the possibility for a cancellation in $$\frac{d\lambda}{d\theta}$$

from one side of the structure 500 to the other.

As done previously, the interactions can be enumerated, in this case considering both ends of the structure 500, because the flux linked at one end can now change the drag at the other. Note that not all of the situations below are feasible in one structure 500 with a given angular separation between radial portions, but these represent all the combinations feasible. As the rotor turns, a given structure 500 fixed in the stator will have a changing angle with respect to the magnetic structure, and will transition between the cases enumerated below. FIG. 3 may help in considering these combinations.

| | $B_{\perp 1} \gg 0$ $\frac{d\lambda_1}{d\theta} \approx 0$ | $B_{\perp 1} > 0$ $\frac{d\lambda_1}{d\theta} < 0$ | $B_{\perp 1} < 0$ $\frac{d\lambda_1}{d\theta} > 0$ | $B_{\perp 1} \ll 0$ $\frac{d\lambda_1}{d\theta} \approx 0$ |
|---|---|---|---|---|
| $B_{\perp 2} \gg 0$ $\frac{d\lambda_2}{d\theta} \approx 0$ | $\tau_b \approx 0$ | $\tau_b < 0$ | $\tau_b > 0$ | $\tau_b \approx 0$ |
| $B_{\perp 2} > 0$ $\frac{d\lambda_2}{d\theta} < 0$ | $\tau_b < 0$ | $\tau_b \approx 0$ $B_\perp$ ohmic | $\tau_b \approx 0$ $\lambda_1, \lambda_2$ | $\tau_b > 0$ |
| $B_{\perp 2} < 0$ $\frac{d\lambda_2}{d\theta} > 0$ | $\tau_b > 0$ | $\tau_b \approx 0$ $\lambda_1, \lambda_2$ | $\tau_b \approx 0$ $B_\perp$ ohmic | $\tau_b < 0$ |
| $B_{\perp 2} \ll 0$ $\frac{d\lambda_2}{d\theta} \approx 0$ | $\tau_b \approx 0$ | $\tau_b > 0$ | $\tau_b < 0$ | $\tau_b \approx 0$ |

In the table above, the middle four entries show cancelation behavior. These entries correspond to situations where both sides of the structure 500 are in the transition region between poles and coupling θ directed flux. In cases where $\lambda_1, \lambda_2$ is indicated, there is a potential for partial cancelation of the rate of change of λ as the rotor moves with respect to the structure 500. This would occur for spacing of traces such that the leakage increases on one side, while decreasing on the other, as a function of θ. In the complementary cases, where $B_\perp$ is indicated in the table, there is a full or partial cancelation of torque based on $B_\perp$. In these cases, while the torque based on the induced current may be low, a relatively high current flows. In the four corners of the table, the θ directed loss terms are small because there is minimal θ-directed flux at from either side.

The eight remaining cases correspond to situations where one end of the structure 500 sees significant $$\frac{d}{d\theta}\lambda$$

and the other is in a region of strong axial flux density. In these cases, $$\frac{d}{d\theta}\lambda$$

changes sign as the rotor moves through the transition, and the corresponding current on the other side of the structure 500 can provide torque either opposing the direction of motion, or in the direction of motion. The negative torque terms associated with these entries exceed the positive torque entries, so the average impact of adjacent traces in these regimes as the rotor turns is drag. However, the symmetry of the associated terms suggest the net drag effect is smaller than the individual drag terms would suggest.

To summarize, the inner via configuration of a typical stator following the teachings of the '625 patent localizes eddy currents induced by pole-to-pole leakage on the rotor. These eddy currents interact with the axial flux component of the flux to produce drag, and may also produce an armature reaction not considered here. If the inner vias are removed, these currents are distributed among radial windings associated with two poles. This may also increase the resistance seen, and the area over which the leakage flux is integrated to form an EMF in the loops, in otherwise comparable designs. However, the integration of the flux over the extended loops formed by the stator without inner vias offers the possibility of cancelation of the rate-of-change of flux coupled, pole-to-pole, lower eddy currents, and less net drag.

Finally, note that the description provided here is for a machine of "in-runner" type, in which the shaft is internal to the stator. If the machine is of "out-runner" construction, i.e., where the stator is supported at the inner radius and phase connections, thermal connections, and similar are disposed at the inner radius, then the description provided here can be similarly reversed. Specifically, the outer end turns in a machine of outrunner construction would be similar to the inner end turns described here, and the vias would similarly be disposed at the inner radius and omitted at the outer radius.

The development of a stator that eliminates the inner vias 108, as in the structure 500 of FIGS. 5A-B, but preserves the distribution end-turn and thermal functions across layers at the outer radius, proceeds from consideration of the role of the inner via 108 in the type of stator the '625 patent describes. In essence, the inner via construction provides two functions. First, the radial traces 106 are explicitly connected in parallel, and second, the inner end turns 102 can be disposed on any layer and in various multiplicities. The '625 patent discloses a specific allocation of inner end turns 102, a construction in which the inner end turns 102 are located on layers associated with a single phase. The necessary condition is simply to form fully connected windings, without conflicting paths that would result in a "short circuit." If the inner vias 108 are omitted, it is still possible to form a winding but only with the radial traces 106 corresponding to the inner end turns 102 present on a given layer. The radial traces 106 present on two or more layers with the same set of inner end turns 102 are still connected in parallel, but that parallel connection extends from an outer via 110 at a first angle, to an outer via 110 at a second angle. The radial traces 106 on a given layer without corresponding inner end turns 102 serve no purpose, so they may be eliminated to reduce the eddy current losses due to the axial field component.

Figure 7:
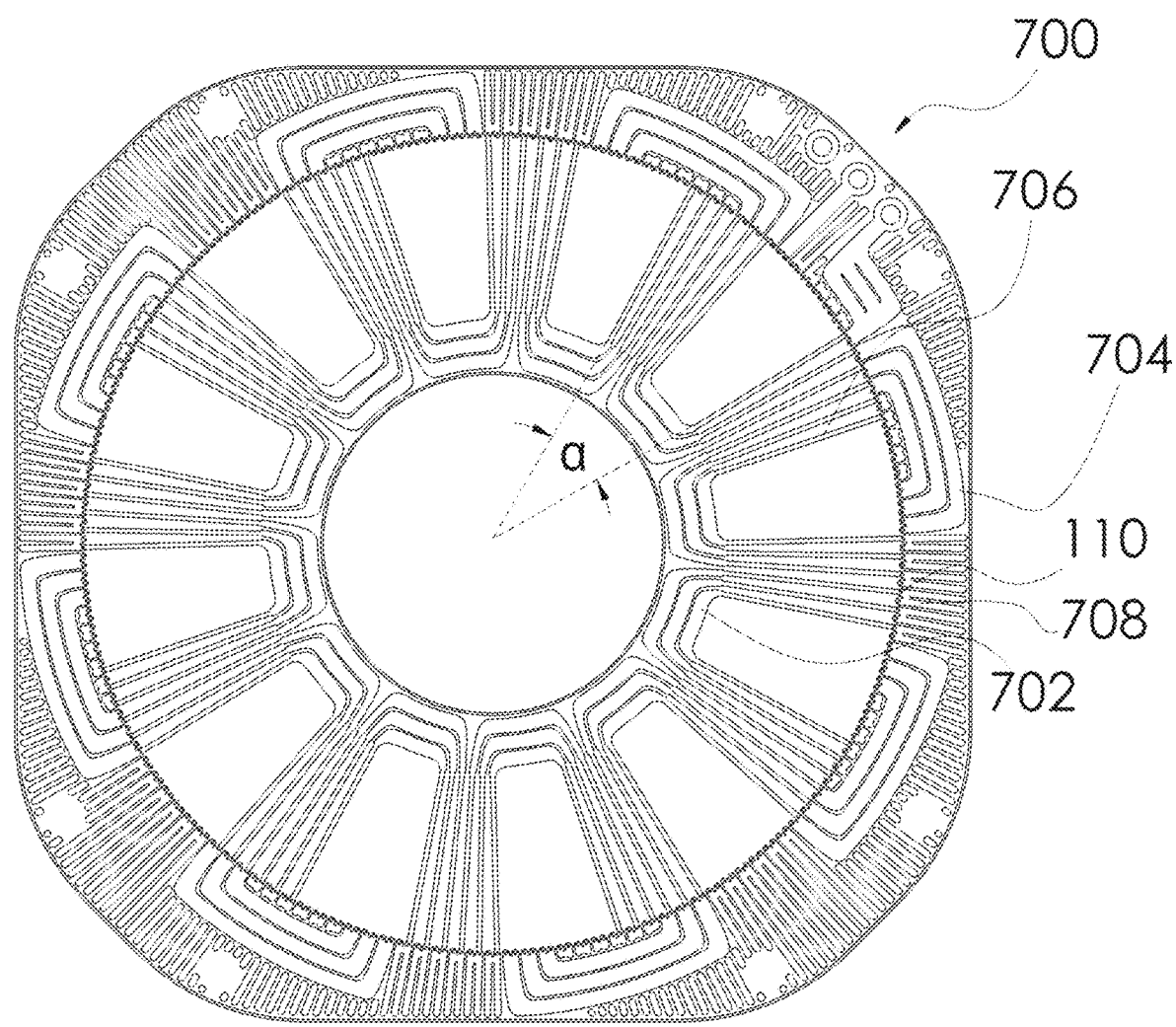
FIG. 7 shows a second layer of a stator configured in accordance with certain teachings of the present disclosure, which is complementary to the first layer shown in FIG. 6.

FIG. 6 shows an example of a single layer 600 of a stator with a construction that omits inner vias 108, as described above. As shown, the layer 600 may include radial traces 606, inner end turns 602, outer end turns 604, and thermal features 608. In the layer 600, each of the radial traces 606 may be connected to corresponding inner end turns 602, and radial traces 606 without inner end turns 602 may be omitted. The inner end turns 602 may be packed as densely as possible. To ensure that the radial traces 606 omitted in the layer 600 in FIG. 6 appear on a different layer, that new layer may have its inner end turns 602 rotated or shifted such that they are complementary to those shown in FIG. 6. An example of such a complementary layer (including radial traces 706, inner end turns 702, outer end turns 704, and thermal features 708) is shown in FIG. 7. FIG. 7 also depicts an angle α corresponding to a pole on the stator. From this, a stator pole may span one or two groups of turns on the layer of stator shown, depending on the angle of the rotor. At any angle, the rotor may interact uniformly with the stator as a whole, because traces at all angles may be present on other layers.

Figure 8:
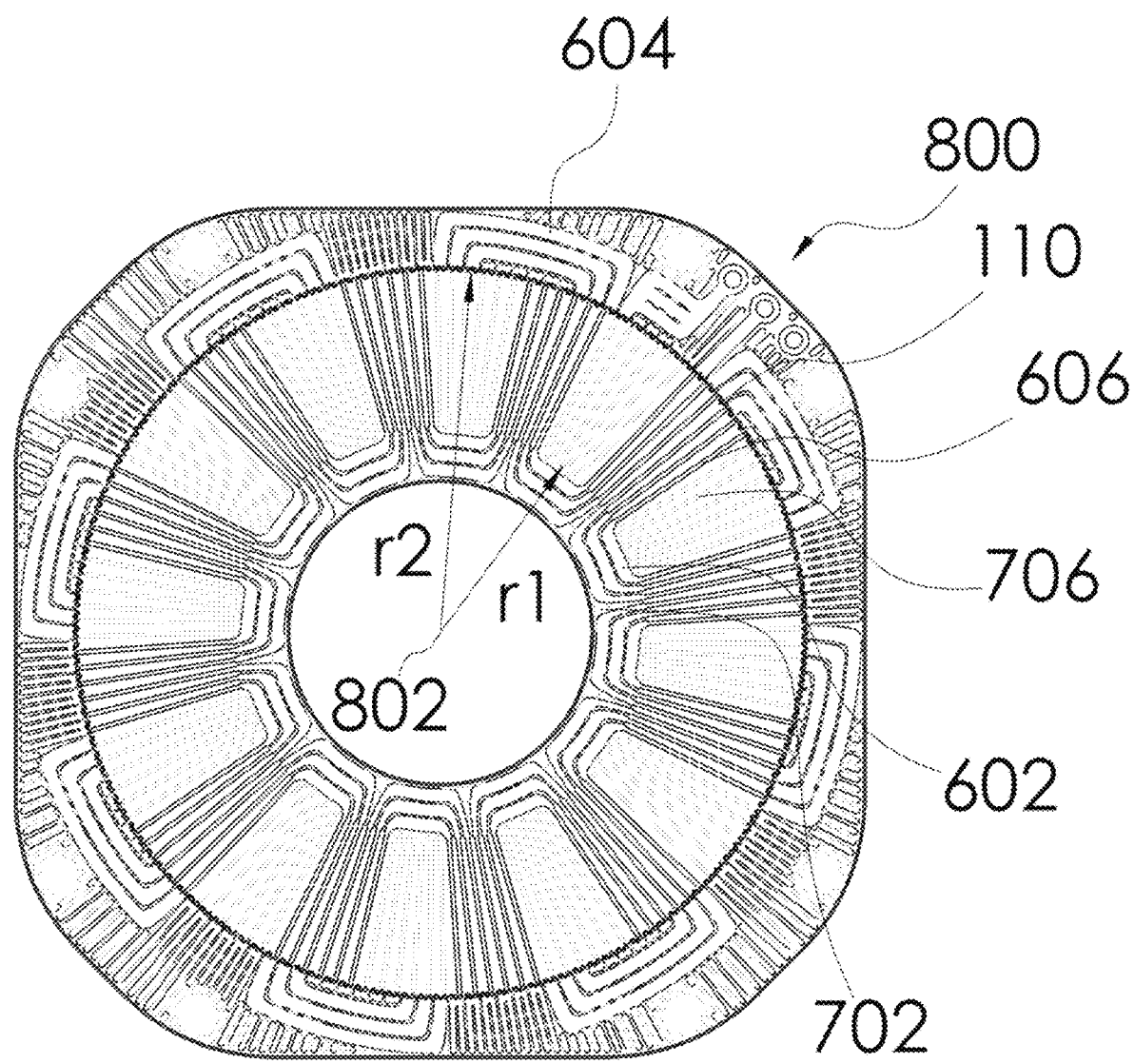
FIG. 8 shows overlay of the layers in FIGS. 6 and 7, showing that with two layers (or a multiple of two layers) the stator with this construction may be uniformly populated with radial traces.

An overlay of the layers in FIGS. 6 and 7 is provided in FIG. 8, showing that with two layers (or a multiple of two layers) the stator with this construction may be uniformly populated with radial traces 606, 706. The annular region of the illustrated stator that extends between a first radial distance r1 (measured from a center point 802 of the stator, which coincides with the axis of rotation of the rotor of the machine) and a second radial distance r2 (also measured from the center point 802) may be located within the annular active region of the machine. The inner and outer radii of the magnets attached to the rotor (not illustrated) of the machine may be positioned at or near the radial distance r1 (measured from the rotor's axis of rotation) and the radial distance r2 (also measured from the rotor's axis of rotation), respectively, thus creating axially directed magnetic flux within the annular active region. Flux density measurements demonstrate that the flux density in this region is typically greater than approximately forty percent of a peak axial flux density within the gap of the machine, while the flux density outside of this region is typically less than forty percent of the peak flux density within the gap.

Figure 9:
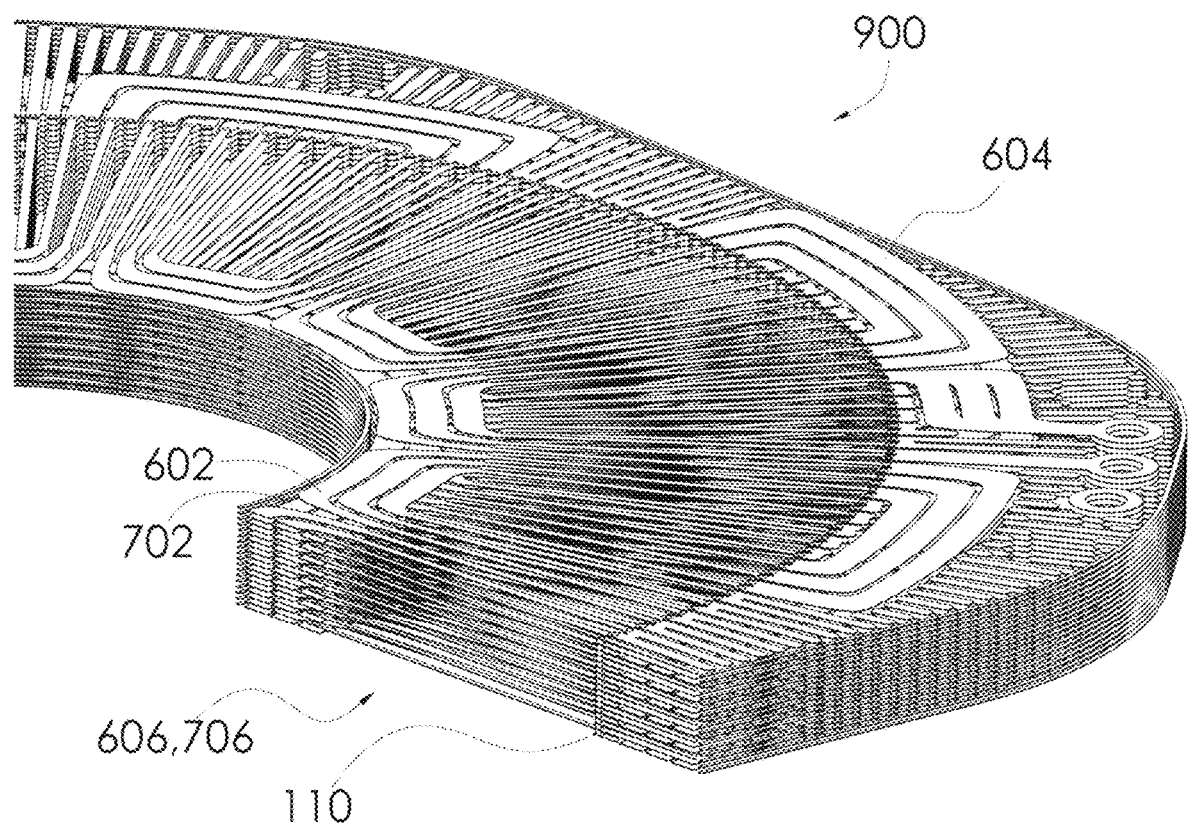
FIG. 9. illustrates how the structures of FIGS. 6 and 7 may be extended to a practical, eighteen-layer stator.

In FIGS. 6 and 7, the outer end turns 604, 704 are associated with a first phase (FIG. 6) and a second phase (FIG. 7), requiring three layers to achieve a complete set of outer end turns. A complete set of inner end turns 602, 702 can be achieved in two layers. While outer end turns 604, 705 could be allocated with higher density, distributing these connections over at least three layers allows room for thermal features 608, 708, phase connections, and the neutral point connection. The outer vias 110 allow thermal, end turn, neutral point, and connection structures to be distributed over multiple layers. The outer vias 110 also allow similar layers to be connected in parallel. FIG. 9 shows this extended to a practical, eighteen-layer stator 900. From the outer vias inwards, all the layers in this structure correspond to either FIG. 6 or FIG. 7, in alternating order.

The trajectory of a single phase through the winding scheme described here is somewhat more involved than a phase in a planar stator corresponding to the '625 patent. Using the same stator as shown in FIGS. 6-9, FIGS. 10 and 11 show a complete single phase connection 1000, omitting inner end turns 602, 702 and all other features associated with other phases. FIG. 11 shows that this winding may be distributed over three layers, because of the choice of the allocation of outer end turns 604. There are only two unique organizations of radial traces 606, 706 and inner end turns 602, 702 inside the radius of the vias 110, one of which occurs in the illustrated structure with multiplicity two (i.e., on the top and middle layers shown in FIG. 11). Of the two identical inner portions represented in FIG. 11, the outer functionality is split between outer end turns 604, and thermal features 608, 708. If the thermal features 608, 708 are omitted, the complete stator can be made in just two layers (e.g., the top and bottom layers shown in FIG. 11), e.g., by reconfiguring the outer end turns 604, 704.

The arrangement of windings described here has several advantages over previously described windings. First, under high speed operation, eddy currents losses in the stator are reduced, relative to stators of conventional design. This facilitates loss-related trade-offs to achieve higher efficiency, higher speed operation at a given efficiency level, and similar. Second, losses that persist in the design described here are moved, relative to a stator of conventional construction, from the inner radius of the machine to the outer radius. There are no losses in circulating currents in the inner radius vias 108, for example. Third, on manufacture of the stator, the inner vias 108 are often "drilled" in a separate operation from the manufacture of the traces. This requires that the layers of the planar stator be aligned and precisely located for drilling. In practice, this means that a clearance of copper around the inner via is required. This limits the minimum spacing between features at the inner radius, which controls the number and combinations of radial features that can be accommodated within a given overall size. In other words, a higher trace density is often possible on a stator without inner vias 108 as compared to a stator of traditional design.

The design described herein has allowed the construction of machines that operate efficiently in excess of 20,000 rpm. Similarly, it has allowed the construction of machines less than 2 centimeters in diameter.

FIG. 1 shows a partial cutaway, perspective view of the layers of a stator 100 designed according to the '625 patent in which the functions of inner end turns 102 and outer end turns 104 are distributed over multiple layers. The radial traces 106 are connected in parallel by both inner vias 108 and outer vias 110 over all layers.

FIG. 2 shows a single layer of the stator in FIG. 1. The vias (shown in FIG. 1) allow radial traces 106 not connected by an inner end turn 102 or an outer end turn 104 on a particular layer to contribute reduced resistance of the radial trace 106 by parallel connection.

FIG. 3 shows a numerical solution of the air-gap flux density for a particular geometry. In particular, FIG. 3 represents a section in the z and θ directions at constant r. Principle components include magnets 306, back irons 308 and the primarily axial solution in the gap 304 between magnets 306 of opposite polarity. The flux leakage between poles shows a θ directed component 302 that can interact with stator features and cause losses.

FIG. 4A shows a generally U-shaped structure 400a within a conventional stator such as that shown in FIG. 1 structure. The vertical axis is exaggerated for clarity.

FIG. 4B shows a planar structure 400b representing how the U-shaped structure 400a of FIG. 4A would appear if it were unwrapped and drawn in a plane. As with FIG. 4A, the vertical axis is exaggerated for clarity. FIG. 4B illustrates the distribution of currents driven in a pair of radial traces 106a, 106b connected by an inner end turn 102. As shown, the overall structure starts at an outer via 110a, proceeds along a first set of radial traces 106a, encounters a first inner via 108a, traverses a set of inner end turns 102, encounters a second inner via 108b, proceeds along a second set of radial traces 106b, and ends on a second outer via 110b. The structure includes the multiple layers shown, and is nominally centered in the gap 304 indicated in FIG. 3. When structure encounters leakage flux 302 (shown in FIGS. 3 and 4), it responds by the currents indicated by the arrows 404 in FIG. 4B. FIG. 4B schematically indicates how the leakage flux 302a-d linked by the windows of the structure decreases as the offset from the centerline of the gap decreases. For clarity, the responsive current indicated by the arrows 404 is shown only on the right-hand side of FIG. 4B to a flux linked in that part of the structure 400. Any response in the rest of the structure 400 would be to flux linked in those locations, and because of the vias 108a, 108b, independent of the responsive currents 404.

FIG. 5A shows a generally U-shaped structure 500a similar to the generally U-shaped structure 500a, but in which the inner vias 108a, 108b are omitted. The vertical axis is exaggerated for clarity.

FIG. 5B shows a planar structure 500b representing how the U-shaped structure 500a of FIG. 5A would appear if it were unwrapped and drawn in a plane. As with FIG. 5A, the vertical axis is exaggerated for clarity. FIG. 5B illustrates the current response (indicated by arrows 504) of this structure to an imposed time-rate of change of leakage flux 302. As illustrated, the responsive current flows in both sides of the structure 500.

FIG. 6 shows the first layer 600 of a stator in which inner end turns 602 are present with the highest possible density, and only radial traces 606 corresponding to the inner end turns 602 are present on the layer. Since there are no radial traces 606 on this layer that need to be linked by inner end turns on another layer, there is no need for inner vias 108. The outer end turns 604 on the layer 600 terminate on outer vias 110, regardless of whether a corresponding radial trace 606 is present on that layer.

FIG. 7 shows a second layer 700 of the stator depicted in FIG. 6. As shown, the inner end turns 702 and associated radial traces 706 are complementary to the inner end turns 602 and radial traces 606 shown in FIG. 6.

FIG. 8 shows the combination 800 of the layer 600 shown in FIG. 6 and the layer 700 shown in FIG. 7, with the layer 600 emphasized and the layer 700 shadowed. FIG. 8 shows that the inner end turns 602, 702 and the radial traces 606, 706 from the individual layers collectively provide a full complement of radial traces and inner end turns, over two layers.

FIG. 9 shows the assembly and combination of several layers, in which the inner end turns 602, 702 and radial traces 606, 706 follow the pattern established in FIG. 8, and the outer vias 110 are used to distribute the end turn, thermal and connection features over multiple layers.

Figure 10:
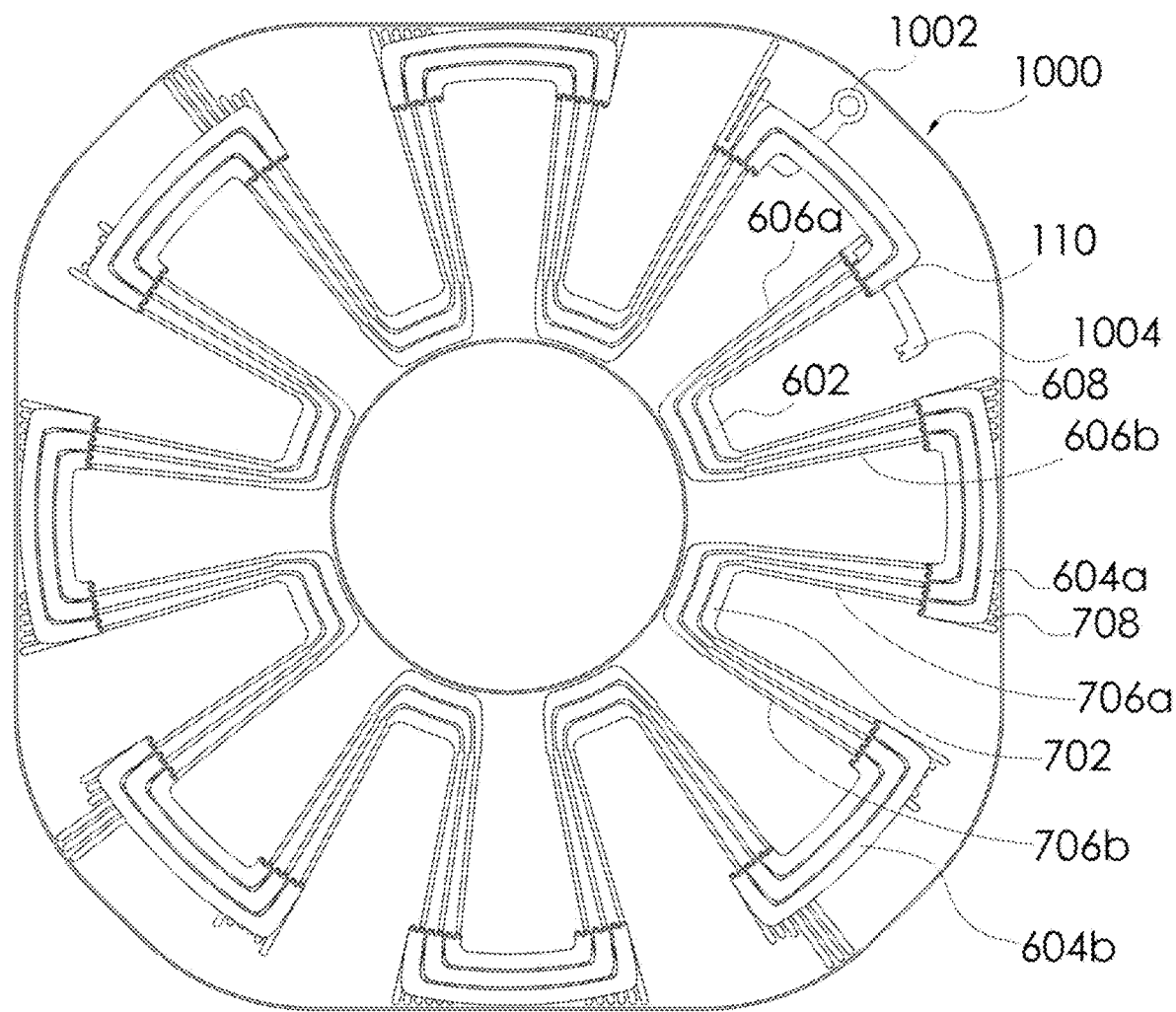
FIG. 10 shows a complete single phase connection for a sixteen-pole, three-turn winding, omitting inner end turns and all other features associated with other phases, that may be established by superimposing three layers such as those shown in FIGS. 6 and 7.
Figure 11:
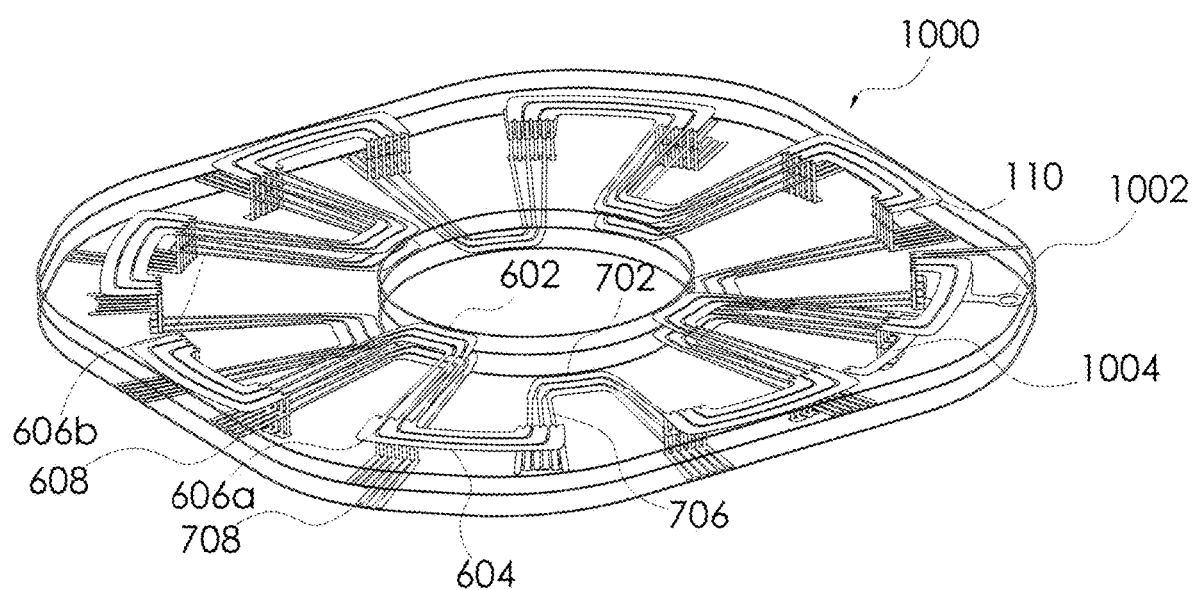
FIG. 11 illustrates the three layers of FIG. 10 in perspective view.

FIG. 10 shows a complete single phase connection 1000 for a 16-pole, 3-turn winding, omitting inner end turns 602, 702 and all other features associated with other phases, that may be established by superimposing three layers like layers 600 and 700 shown in FIGS. 6 and 7. The illustrated path begins at the phase connection 1002 and includes radial traces 606a, 606b, 706a, 706b, inner end turns 602, 702, outer end turns 604a, 604b, and outer vias 110. As illustrated, a portion of the neutral point connection 1004 may connect the phase shown to others to form a neutral point. Not all the features in FIG. 10 can be placed on a single layer, particularly if similar features for other phases are considered.

FIG. 11 illustrates the three layers of FIG. 10 in perspective view. The single phase of FIG. 10 is supported by both types of the layers 600 and 700 shown in FIGS. 6 and 7. In the illustrated example, one of those types of layers is employed in both the top and middle layers in the stack, and the other type of layer is employed in the bottom layer. The outer end turns 604 for the phase appear on the top layer. Thermal features for the phase appear on the bottom layer, where they do not interfere with the end turns of another phase. Also on the bottom layer is the power connector 1002. The middle layer includes the neutral point connection 1004.

Figure 12:
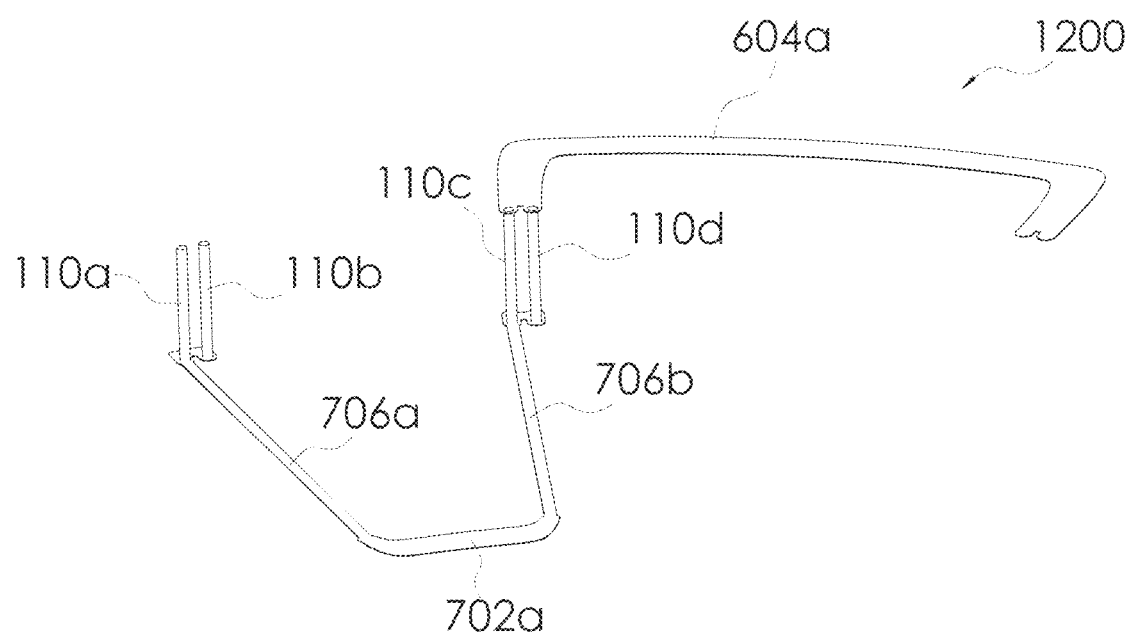
FIG. 12 shows a first example structure embodied within the stator shown in FIGS. 10 and 11.
Figure 13:
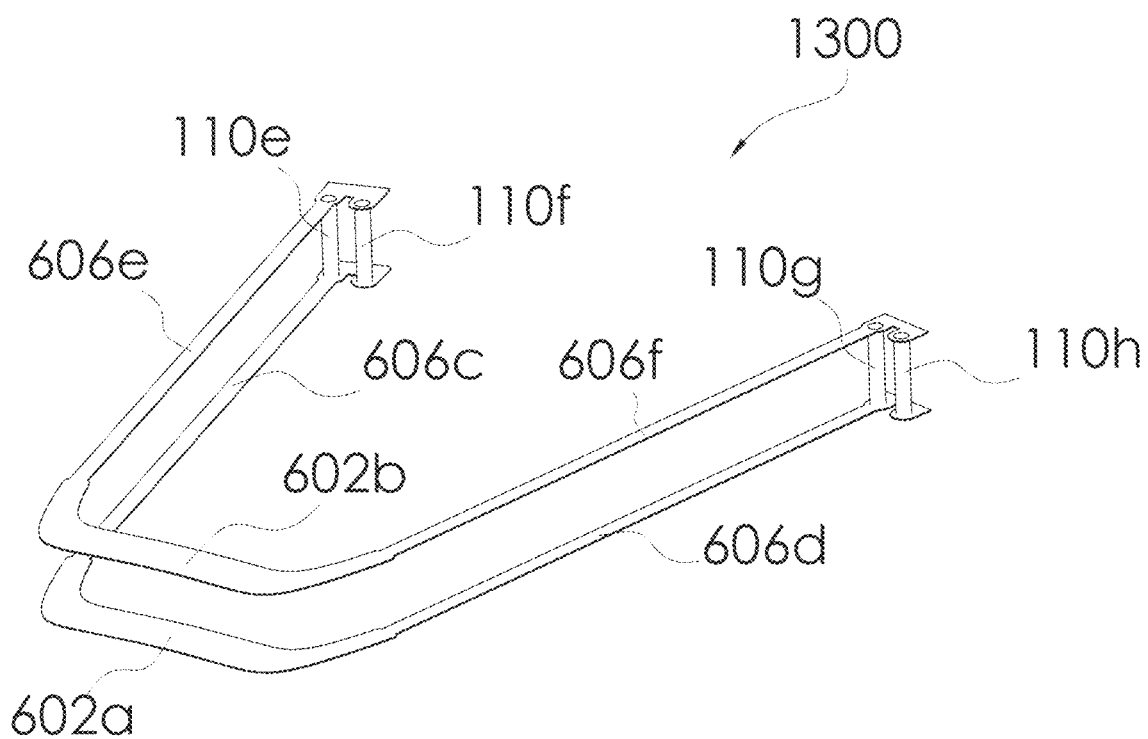
FIG. 13 shows a second example structure embodied within the stator shown in FIGS. 10 and 11.

FIGS. 12 and 13 show a first example structure 1200 and a second example structure 1300, respectively, that are embodied within the stator 1000 shown in FIGS. 10 and 11 and that may provide various performance benefits for axial flux machines as outlined herein. In this regard, should be appreciated that the structures 1200, 1300 may have applicability and provide similar benefits to structures other than the stator 1000. Accordingly, the additional features and/or nuances of the particular configuration shown FIGS. 10 and 11 should not be considered as limiting.

Referring first to FIG. 12, radial traces 706a, 706b and an inner end turn 702a may be included in a first conductive layer, and an outer end turn 604a may be included in a second conductive layer. Although not specifically illustrated, it should be appreciated that the structure 1200 may additionally include one or more dielectric substrates supporting such conductive layers. Such dielectric substrates may be adapted to be positioned within an annular active region of an axial flux machine that includes a rotor configured to rotate about an axis of rotation. As noted above, the annular portion of the stator in which the radial traces 706a, 706b are disposed may be positioned within the "active" region of the machine, as that is the region that is primarily responsible for the production of torque in the machine.

As shown in FIG. 12, the structure 1200 may also include at least a first conductive via 110a and a second conductive via 110c extending between the first and second conductive layers. The first conductive via 110a and the second conductive via 110d may be positioned to be located radially on a first side of the annular active region. In some implementations, additional conductive vias 110b, 110d may likewise extend between the first and second conductive layers (e.g., in parallel with the first and second conductive vias 110a, 110c, respectively) and may also be positioned to be located radially on the first side of the annular active region. The radial traces 706a, 706b and an inner end turn 702a may together form a first conductive trace in the first conductive layer. The inner end turn 702a may be positioned to be located radially on a second side of the annular active region, second side being opposite the first side. As shown, that first conductive trace may extend along a first path that begins at the first conductive via 110a, passes through the inner end turn 702a, and ends at the second conductive via 110c.

The outer end turn 604a may form a second conductive trace in the second conductive layer. The outer end turn 604a may be positioned to be located radially on the first side of the annular active region. As shown, that second conductive trace may extend along a second path that begins at the second conductive via 110c and passes through the outer end turn 604a. The second conductive trace (e.g., including the outer end turn 604a) may be connected to the first conductive trace (e.g., including the radial traces 706a, 706b and the inner end turn 702) through the second conductive via 110c so that the first and second paths are connected in series. In some implementations, the second conductive trace (e.g., including the outer end turn 604a) may terminate on an additional conductive via (not illustrated in FIG. 12) that may extend between the first and second conductive layers and be positioned to be located radially on the first side of the annular active region, thus enabling a connection from the additional conductive via to another radial trace (also not illustrated in FIG. 12). The location of such an additional conductive via may depend on whether the windings of the stator are arranged in a serpentine pattern or a coil pattern.

As can be seen in FIG. 12, in the structure 1200 all conductive vias that interconnect the first conductive trace (e.g., including the radial traces 706a, 706b and the inner end turn 702) and the second conductive trace (e.g., including the outer end turn 604a) are positioned to be located radially on the first side of the annular active region. The omission of conductive vias on the second side of the annular active region, as well as at other locations, may provide numerous advantages, such as reducing losses due to eddy currents caused by θ-directed flux, as outlined above.

Referring next to FIG. 13, radial traces 606c, 606d, and an inner end turn 602a may be included in a first conductive layer, and radial traces 606e, 606f and an inner end turn 602b may be included in a second conductive layer. Although not specifically illustrated, it should be appreciated that the structure 1300 may additionally include one or more dielectric substrates supporting such conductive layers. Such dielectric substrates may be adapted to be positioned within an annular active region of an axial flux machine that includes a rotor configured to rotate about an axis of rotation. As noted above, the annular portion of the stator in which the radial traces 606c, 606d, 606e, 606f are disposed may be positioned within the "active" region of the machine, as that is the region that is primarily responsible for the production of torque in the machine.

As shown in FIG. 13, the structure 1300 may also include at least a first conductive via 110e and a second conductive via 110g extending between the first and second conductive layers. The first conductive via 110e and the second conductive via 110g may be positioned to be located radially on a first side of the annular active region. In some implementations, additional conductive vias 110f, 110h may likewise extend between the first and second conductive layers (e.g., in parallel with the first and second conductive vias 110e, 110g, respectively) and may also be positioned to be located radially on the first side of the annular active region.

The radial traces 606c, 606d and the inner end turn 602a may together form a first conductive trace in the first conductive layer. The inner end turn 602a may be positioned to be located radially on a second side of the annular active region, the second side being opposite the first side. As shown, that first conductive trace may extend along a first path that begins at the first conductive via 110e, passes through the inner end turn 602a, and ends at the second conductive via 110g. Similarly, the radial traces 606e, 606f and the inner end turn 602b may together form a second conductive trace in the second conductive layer. The inner end turn 602b may be positioned to be located radially on the second side of the annular active region. As shown, that second conductive trace may extend along a second path that begins at the first conductive via 110e, passes through the inner end turn 602b, and ends at the second conductive via 110g.

As can be seen in FIG. 13, in the structure 1300, all conductive vias that interconnect the first conductive trace (e.g., including the radial traces 606c, 606d and the inner end turn 602a) and the second conductive trace (e.g., including the radial traces 606e, 606f and the inner end turn 602b) are positioned to be located radially on the first side of the annular active region. The omission of conductive vias on the second side of the annular active region, as well as other locations, may provide numerous advantages, such as reducing losses due to eddy currents caused by θ-directed flux, as outlined above.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A planar stator, comprising:
   one or more dielectric substrates adapted to be positioned within an annular active region of an axial flux machine that includes a rotor configured to rotate about an axis of rotation;
   conductive traces included in at least first and second conductive layers defined by the one or more dielectric substrates, the conductive traces forming windings for poles of the stator; and
   at least first and second conductive vias extending between and interconnecting portions of the conductive traces in the first and second conductive layers, the first and second conductive vias being positioned to be located radially on a first side of the annular active region;
   wherein:
      the conductive traces include a first conductive trace in the first conductive layer, the first conductive trace includes a first end turn positioned to be located radially on a second side of the annular active region, the second side being opposite the first side, the first conductive trace extends along a first path that begins at the first conductive via, passes through the first end turn, and ends at the second conductive via, the conductive traces include a second conductive trace in the second conductive layer, the second conductive trace includes a second end turn positioned to be located radially on the first side of the annular active region, the second conductive trace extends along a second path that begins at the second conductive via and passes through the second end turn, the second conductive trace is connected to the first conductive trace through the second conductive via so that the first and second paths are connected in series, and all conductive vias that interconnect the first and second conductive traces are positioned to be located radially on the first side of the annular active region.

2. The planar stator of claim 1, further comprising:

a third conductive via extending between the first and second conductive layers and positioned to be located radially on the first side of the annular active region, wherein the second path along which the second conductive trace extends begins at the second conductive via, passes through the second end turn, and ends at the third conductive via.

3. The planar stator of claim 2, wherein the third conductive via is positioned such that the first conductive trace and the second conductive trace form a portion of a serpentine shaped winding.

4. The planar stator of claim 2, wherein the third conductive via is positioned such that the first conductive trace and the second conductive trace form a portion of a spiral shaped winding.

5. The planar stator of claim 2, further comprising:

a fourth conductive via extending between the first and second conductive layers and positioned to be located radially on the first side of the annular active region; and a third conductive trace in the second conductive layer, the third conductive trace including a third end turn positioned to be located radially on the second side of the annular active region, wherein the third conductive trace extends along a third path that begins at the third conductive via, passes through the third end turn, and ends at the fourth conductive via.

6. The planar stator of claim 5, wherein the one or more dielectric substrates further define a third conductive layer, the third conductive via extends through the third conductive layer, and the stator further comprises:

a fourth conductive trace in the third conductive layer, the fourth conductive trace including a fourth end turn positioned to be located radially on the second side of the annular active region, wherein the fourth conductive trace extends along a fourth path that begins at the third conductive via, passes through the fourth end turn, and ends at the fourth conductive via.

7. The planar stator of claim 6, wherein:

all conductive vias that interconnect the third and fourth conductive traces are positioned to be located radially on the first side of the annular active region.

8. The planar stator of claim 1, further comprising an additional via extending between the first and second conductive layers and positioned to be located radially on the first side of the annular active region, wherein the second conductive trace is further connected to the first conductive trace through the additional conductive via.

9. The planar stator of claim 1, wherein the first end turn is an inner end turn and the second end turn is an outer end turn.

10. The planar stator of claim 1, wherein the first end turn is an outer end turn and the second end turn is an inner end turn.

11. An axial flux motor or generator comprising the planar stator of claim 1.

12. A planar stator, comprising:

one or more dielectric substrates adapted to be positioned within an annular active region of an axial flux machine that includes a rotor configured to rotate about an axis of rotation;

conductive traces included in at least first and second conductive layers defined by the one or more dielectric substrates, the conductive traces forming windings for poles of the stator; and at least first and second conductive vias extending between the first and second conductive layers, the first and second conductive vias being positioned to be located radially on a first side of the annular active region;

wherein:

the conductive traces include a first conductive trace in the first conductive layer, the first conductive trace includes a first end turn positioned to be located radially on a second side of the annular active region, the second side being opposite the first side, the first conductive trace follows a first path beginning at the first conductive via, extending through the first end turn, and ending at the second conductive via, the conductive traces include a second conductive trace in the second conductive layer, the second conductive trace includes a second end turn positioned to be located radially on the second side of the annular active region, the second conductive trace follows a second path beginning at the first conductive via, extending through the second end turn, and ending at the second conductive via, and all conductive vias that interconnect the first and second conductive traces are positioned to be located radially on the first side of the annular active region.

13. The planar stator of claim 12, wherein the first path has a same size and shape as the second path.

14. The planar stator of claim 12, wherein the first and second end turns are inner end turns.

15. The planar stator of claim 12, wherein the first and second end turns are outer end turns.

16. The planar stator of claim 12, further comprising:

a third conductive via extending between the first and second conductive layers, the third conductive via being positioned to be located radially on the first side of the annular active region; and a third conductive trace in the second conductive layer, the third conductive trace including a third end turn positioned to be located radially on the first side of the annular active region, wherein the third conductive trace extends along a third path that begins at the second conductive via, passes through the third end turn, and ends at the third conductive via.

17. The planar stator of claim 16, wherein the one or more dielectric substrates further define a third conductive layer, the third conductive via extends through the third conductive layer, and the stator further comprises:
- a fourth conductive via extending through the first, second and third conductive layers, the fourth conductive via being positioned to be located radially on the first side of the annular active region; and
- a fourth conductive trace in the third conductive layer, the fourth conductive trace including a fourth end turn positioned to be located radially on the second side of the annular active region, wherein the fourth conductive trace extends along a fourth path that begins at the third conductive via, passes through the fourth end turn, and ends at the fourth conductive via.

18. An axial flux motor or generator comprising the planar stator of claim 12.

* * * * *